July 26, 1932.  R. C. CAMPBELL  1,868,883
CONTINUOUS FILTER
Filed June 23, 1927  4 Sheets-Sheet 1
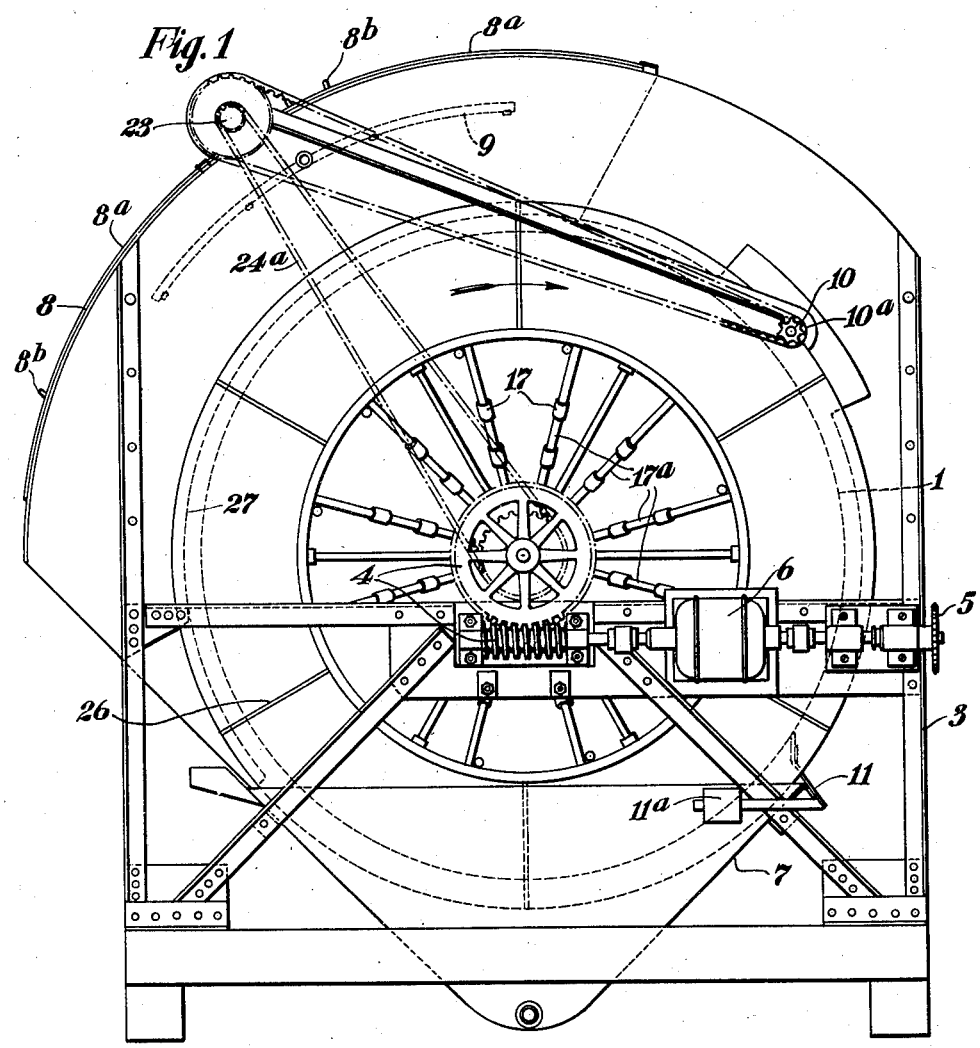
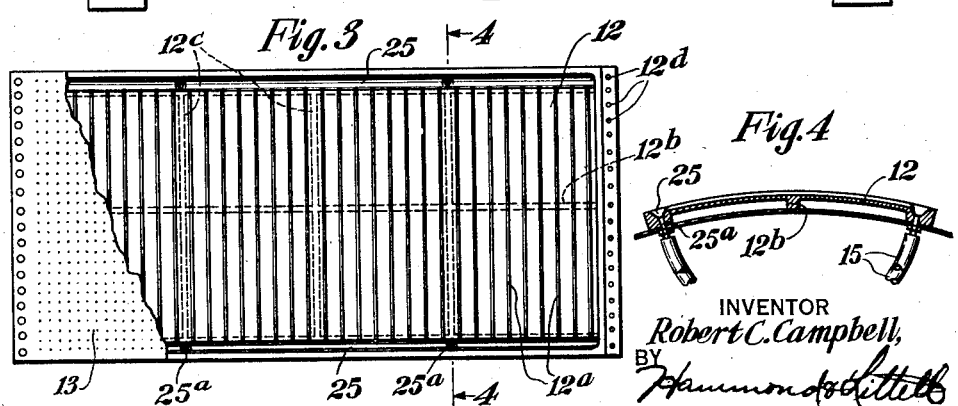
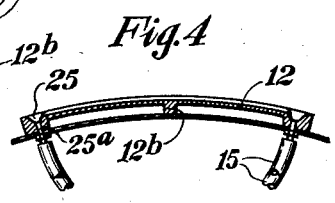
INVENTOR
Robert C. Campbell,
BY
Hammond & Littell
ATTORNEYS

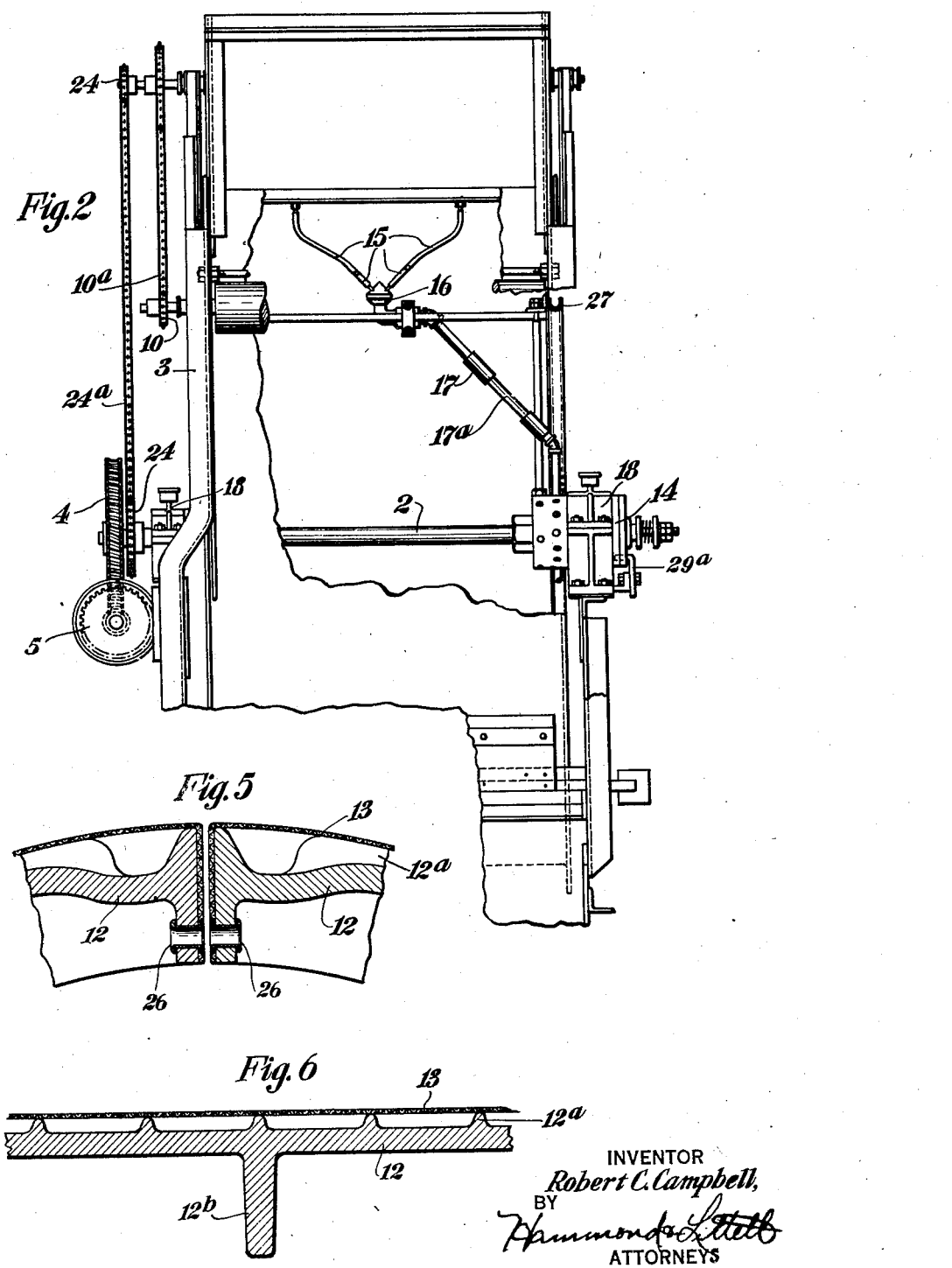

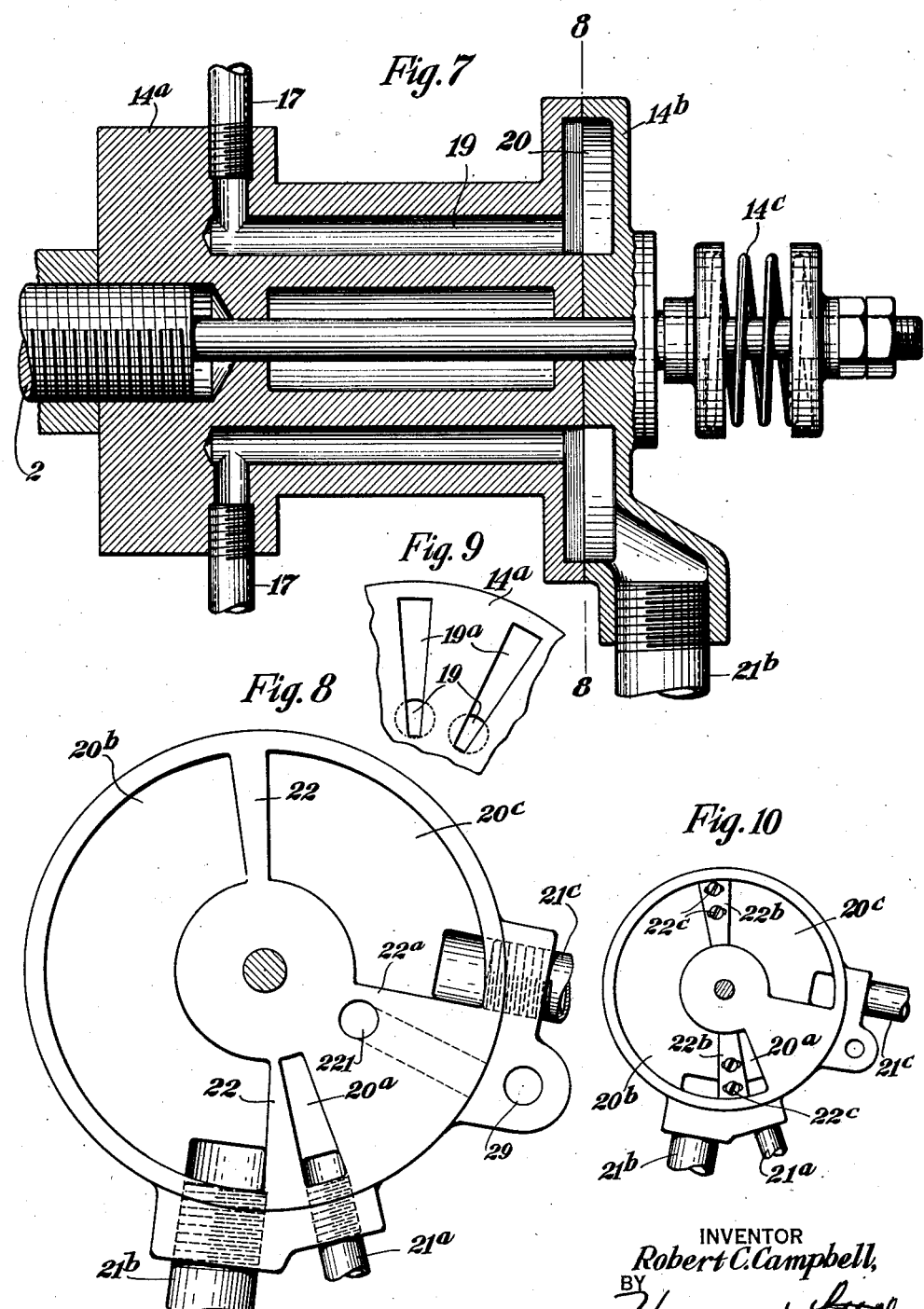

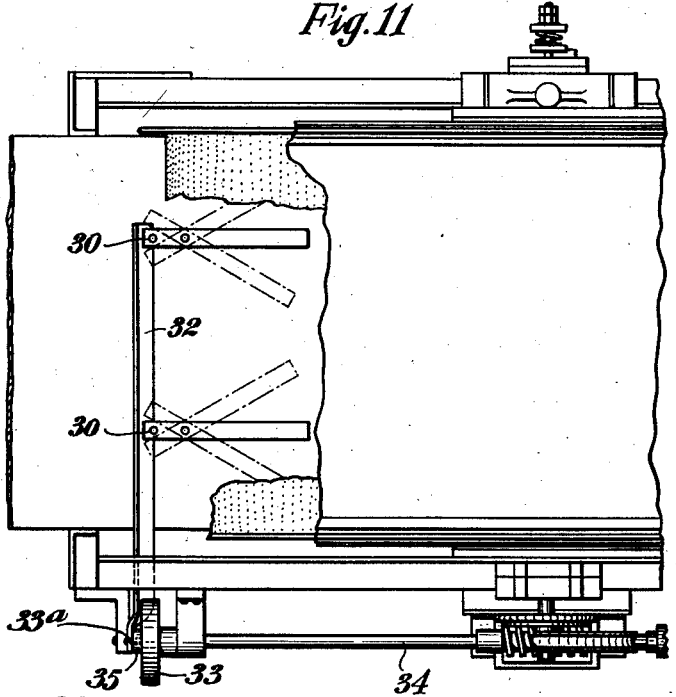
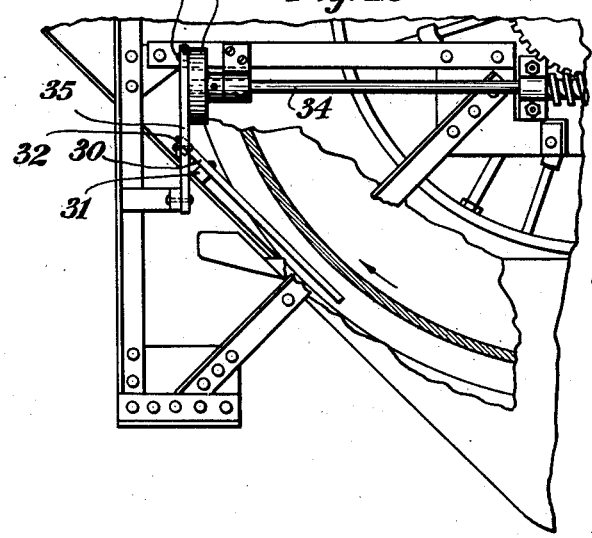
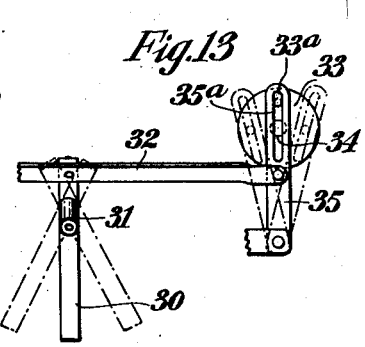
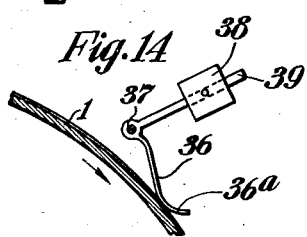

Patented July 26, 1932

1,868,883

UNITED STATES PATENT OFFICE

ROBERT C. CAMPBELL, OF MILLBURN, NEW JERSEY, ASSIGNOR, BY MESNE ASSIGNMENTS, TO OLIVER UNITED FILTERS INC., OF SAN FRANCISCO, CALIFORNIA, A CORPORATION OF NEVADA

CONTINUOUS FILTER

Application filed June 23, 1927. Serial No. 200,872.

This invention relates to an improvement in continuous filters, particularly of the drum type, although certain features to be hereinafter described are applicable to continuous filters of the leaf type also.

It is an object of the invention to provide a filter having a filtering period of relatively short duration with a washing and drying period of much longer duration than heretofore used to permit more complete removal of the values to be recovered from the filter cake while in position on the filter.

Another object of the invention is to provide a filter in which the capacity of the filtrate pipes, with reference to the amount of filtrate withdrawn, is lower than in previous practice to reduce the amount of filtrate contained in the pipes and permit more complete separation of the various portions of the filtrate and wash water.

Another object of the invention is to provide a simplified construction of a filter of this type in which all of the parts are of simple design and of easy access to permit economical manufacture, assembly and repair.

Another object of the invention is to provide an improved type of filtrate segment particularly adapted to the use of drum filters.

A further object of the invention is to provide an improved means for smoothing and regulating the thickness of the filter cake to prevent cracking thereof during drying and prevent free flow of air through the cracks into the vacuum chambers.

Various other objects and advantages will appear as the description of the invention proceeds.

Referring now to the drawings, which show a preferred form of embodiment of the invention:

Fig. 1 is a side view of the filter partially in outline showing the relative arrangement and size of the various parts.

Fig. 2 is an end view with parts broken away to show the interior construction of the filter shown in Fig. 1.

Fig. 3 is a plan view of one of the filter segments.

Fig. 4 is a sectional view on the line 4—4 of Fig. 3.

Fig. 5 is a sectional view through the edge of adjacent filter segments showing the means for attaching the filter medium.

Fig. 6 is an enlarged detail sectional view of one of the filter segments.

Fig. 7 is a sectional view, and Figs. 8 and 9 are an end view of the filtrate discharge valve.

Fig. 10 is an end view of a modified form of discharge valve.

Fig. 11 is a plan view with parts broken away and Fig. 12 is a sectional view showing the arrangement of the agitator in the sludge pan.

Fig. 13 is a detail view of the means for driving the agitator.

Fig. 14 is a detail view of a modified form of cake smoothing means.

The filter illustrated and described in this application is particularly adapted for the filtration of cachaza mud from the thickeners or settling tanks of a sugar mill, although the principles described are, of course, applicable to the filtration of other substances having similar properties. Previous filtration of the cachaza muds from the settling tanks or thickeners of a sugar mill in plate and frame filters normally leaves about five per cent. of sugar content in the cake which it is desirable to reduce as much as practicable to recover the sugar value. Previous attempts to filter the cachaza muds in a continuous filter wherein the cake can be efficiently washed to reduce the sugar content have, however, met with little success, due to the necessity for using a very fine mesh filtering medium which, on account of the retention of the gummy constituent and fine mud in the pores thereof, quickly became clogged and unfit for further use without frequent complete cleaning which, on account of the labor involved, made the use of such previous continuous filters commercially prohibitive.

As described in my previous application, Serial No. 28,549, filed May 7, 1925, this tendency of the sugar muds to clog the fibres of a continuous filter medium and stop the filtering may be overcome by the use of a perforated plate or smooth rolled screen filtering medium which offers no opportunity for the gum and fine mud to lodge and harden in the pores thereof, and which may be completely cleaned during each cycle of filter operation, the perforated plate filtering medium acting, during the early portion of the filtering period, to build up a cake of sufficient density to stop further flow of mud therethrough and to deliver a clear filtrate after the first few seconds of the filtering period. The filtration of cachaza muds according to my previous patent has been highly successful.

In order, however, to prevent contamination of the clear filtrate by the cloudy filtrate which passes thru the filtering medium for the first few seconds after the beginning of the filtering period, it is necessary to divide the filtrate into two portions, the cloudy portion, which passes through the filtering medium at the start of the filtering operation, and the clear portion which is produced only after a preliminary cake has been formed on the filter usually after the first ten or fifteen seconds of the filtering period and to refilter the cloudy portion and pass the clear portion of the filtrate to the evaporators. In order to properly separate these two portions of the filtrate, it is desirable that the amount of filtrate between the filtering medium and the filtrate discharge point be kept as low as possible so that the cloudy portion of the filtrate may be displaced between the filtering medium and the filtrate discharge point with a small percentage of the clear filtrate before any portion of the clear filtrate is directed to the evaporators, and this is provided by the improvements described herein.

Another point in connection with cachaza filtration is that the cachaza mud filters very readily and in a short filtering period may build up a comparatively thick cake which must be thoroughly washed to reduce the sugar content thereof before discharge from the filter so that the filter disclosed in this application is arranged to provide a relatively short filtering period during which a moderate and dense cake is formed to provide a means for preventing the mushy cake in excess of the desired thickness from being carried up by the drum and to provide a relatively long washing and drying period for washing out the sugar values.

In the embodiment of the invention illustrated, the filter comprises a drum 1 which is rotated by means of a suitably central shaft 2 supported in bearings 18 in a stationary frame 3, the shaft being driven by means of a worm and worm wheel 4 from any suitable source of power connected to the driving gear 5. A reduction gearing located in the gear box 6 is provided for changing the speed of rotation to suit desired conditions.

The lower portion of the drum 1 dips into a sludge tank 7 adapted to receive the muds to be filtered and to normally immerse about one-fifth of the surface of the drum therein giving an effective filtering surface of approximately one-tenth the area of the drum. Adjacent one side of the drum a suitable housing 8 is provided in which the wash water or spray pipes 9 are located for spraying the filter cake, on this portion of the drum, with water to wash out the sugar values. At the opposite side of the drum, air may be drawn through the filter cake to dry the same and a suitable smoothing roller 10 is provided to smooth out the cracks formed in the cake during the drying operation to prevent free flow of air therethrough. Adjacent the point of entrance of the drum 1 into the sludge tank 7, a scraping member 11 mounted on a suitable pivot and counterweight 11a is provided to remove the dried cake from the drum surface to permit the formation of a new cake on the surface of the drum as the lower portion thereof passes through sludge tank 7.

The surface of the drum 8 is made up of a plurality of curved filtering pans or segments 12 each of which is removable and interchangeable and forms a complete filtering unit. The segments 12 abut one another around the surface of the drum forming a substantially continuous filtering area except at the joints between the segments. Each of the filtering pans or segments is covered with a suitable filtering medium 13 which may be made of smooth rolled fine mesh wire, wire mesh fabric or the like, but is preferably of perforated plate, such as No. 00 perforated brass having about 625 holes of .02″ diameter per square inch as described in my previous patent. The filtering medium is spaced from the bottom of the pans 13 by means of the ledges 12a, and each of the filtering pans is connected to the filtrate discharge valve 14 by means of a plurality of filtrate pipes 15, preferably four in number, communicating with a web or manifold casting 16 which, in turn, is connected by a suitable pipe 17 to the filtrate valve, the sight glass 17a in the pipe 17 provides for observation of the filtrate flowing from any particular segment. The pipes 17 communicate with the filtrate valve 14 at a point inside the frame bearing 18 and from there flow through the passages 19 and radial channels 19a in the face of the valve into the various chambers 20 at the end of the filtrate valve. The chambers 20 are preferably divided into a cloudy filtrate receiving chamber 20a from which the cloudy filtrate is drawn through the pipe 21a, the clear filtrate and wash water chamber 20b communicating with the discharge pipe 21b and the drying chamber 20c communicating with the drying outlet pipe 21c, the end of the filtrate valve being provided with suitable partitioning walls 22 dividing the chamber 20, as described.

Each of the pipes 21a, 21b and 21c is preferably connected to a separate vacuum chamber under a suitable high vacuum to draw the filtrate through the filtering medium and the various pipes into the corresponding vacuum chamber so that during the rotation of the drum 1 in a clockwise direction, as indicated, the segments 12, as they enter the sludge pan 7, will communicate through the chamber 20a, passages 19, pipes 17 and 15 with the cloudy filtrate receiver so that the suction in the cloudy filtrate receiver will draw the filtrate through the filtering medium on the pan 12, gradually building up a thickness of filter cake sufficient to form an effective filtering medium and to prevent further passage of a cloudy filtrate therethrough.

Continued rotation of the drum 1 brings the segment 12 into communication with the clear filtrate and wash water receiver through the pipe 21b, chamber 20b, passages 19, etc., so that the clear filtrate, which passes through the segment 12 during the remainder of the filtering period, will be collected in the clear filtrate receiver and as further rotation of the drum 1 removes the segment 12 from the pan 7, wash water from the nozzles 9 is sprayed in a fine mist on the cake adhering to the segments 12 on the filter drum and sucked through the cake into the clear filtrate receiver to wash out the sugar values, the clear filtrate and wash water being sent to the evaporators for the recovery of the sugar content thereof. Further rotation of the drum 1 brings the interior of the segments 12 into communication with the drying receiver and the suction in this receiver draws air through the cake on the segment 12 to reduce the moisture content therein before the segment reaches the cake remover 11 where the dried cake is removed from the segment just previous to the reentry of the segment 12 into the sludge pan 7. At the point corresponding to the position of the cake remover 11, a bridge wall 22a cuts off communication of the pan 12 with all sources of suction and a port 22l communicating with the atmosphere lets air into the adjacent segment to break the vacuum to assist in the removal of the cake. It will be understood that during the cycle of operation as described with reference to one segment, the other segments around the drum are concurrently going thru some portion of the cycle.

The segments 12 are each of rectangular shape, as shown in Figure 3, and are curved on the arc of the drum, as shown in Figure 4. The segments are preferably formed of cast aluminum or other light non-corrosive metal and are reinforced on the back by an integral longitudinal rib 12b and a plurality of cross ribs 12c. A trough 25 extends along each side of the segment and receives the filtrate passing through the filtering medium and flowing in the channels between the ridges 12a. Each trough is preferably provided with two or more outlet nipples 25a to which the pipes 15 are connected to convey the suction from the vacuum tanks to the interior of the segments 25 and to draw off the filtrate. Perforations 12d are provided in the metal at each end of the sectors 12 for securing the filter medium 13 thereto. At each side the filter medium 13 is bent over the edge of the segments 12 and is secured thereto by rivets 26 which pass through the edge flange of the segments 12 and through the filter medium 13 therebetween, as illustrated in Figure 5.

The ridges 12a, which space the filter medium from the sectors 12 forming a filtrate chamber, are preferably reduced in height and increased in number so as to properly support the filter medium at all points and yet provide a space of minimum size between the filter segment and the filtering medium. The size of the pipe 15 and of the manifold 16 and pipes 17 are likewise reduced to the smallest possible diameter which will properly carry away the filtrate and wash water in order to reduce the amount of cloudy filtrate which will remain in the filter sector and the pipes after the flow of the clear filtrate begins, as it is desirable to begin passing the clear filtrate to the evaporators as soon as sufficient cake has been formed on the sector 12 entering the sludge tank 7 to produce a clear filtrate. It is not permissible, however, to conduct any of the cloudy filtrate, which may be trapped in the filter pipes, to the clear filtrate receiver and it is, therefore, necessary to continue the communication with the cloudy filtrate receiver until the filtrate has begun to run clear and the clear filtrate has filled the pipes from the filter segments to the discharge valve, or, in other words, until the clear filtrate has displaced the cloudy filtrate in these pipes, before collection of the clear filtrate is begun so that the smaller the size of these pipes, the less the amount of cloudy filtrate which will be trapped therein. Preferably the combined internal volume of the filtrate discharge pipes and the segments 12 is less than one tenth ($\frac{1}{10}$) the amount of clear filtrate produced. For example, in a filter passing 1000 cc. of clear filtrate in ten seconds, the internal volume of the segments and pipes should be less than 100 cc. so that the cloudy filtrate in the pipes when the filtrate begins to run clear, may be quickly displaced and the clear filtrate directed to the evaporators. In a filter 6 ft. in diameter and having 12 segments, I prefer to have the ribs 12a spaced $\frac{3}{4}''$ apart and $\frac{3}{32}''$ high giving the segment an internal volume of 63.6 cu. inches, and to use $\frac{1}{4}''$ pipes from the segment to the manifold 16, and $\frac{1}{2}''$ pipes from the manifold to the valve giving an internal volume of 15.92 cu. inches for the piping.

It will be noted that the sludge tank 7 is of much less depth than is customary in continuous filters and that only a small portion of the drum is submerged therein, for the reason that the cachaza mud filters very freely and therefore a long filter period is not necessary to produce a substantial thickness of cake and also for the reason that a longer washing and drying period is desirable to assist in the recovery of the major portion of the sugar values from the muds. Because of the low depth of the sludge tank 7, the ends of the drum are enclosed for only about one-third the distance inward from the circumference, suitable annular plates 26 being used for this purpose. A U-shaped trough 27 is provided at the inner edge of the plates 26 to receive any of the sludge which may run over the sides of the filter and conduct the same back into the tank 7. Inside the plates 26, the pipes 17, the shaft 2 and the inner end of the filtrate valve are exposed for easy inspection and removal.

To prevent the sludge from settling in the bottom of the sludge pan 7 and away from the filtering zone adjacent the surface of the drum 1, a suitable agitating means may be provided. While the various types of agitating means may be used for this purpose, it is preferable to arrange the agitating means adjacent the point at which the drum leaves the sludge pan 7 so that the agitation at this point will serve to remove any adhering mushy cake permitting only fairly solid cake to be drawn out of the pan 7 by the drum and to quickly disperse any mushy cake which slurs off the drum at the point which the drum leaves the tank.

To serve this purpose I have provided a pair of agitating paddles 30 which are pivoted to the upper edge of the pan 7 on suitable pivots 31 and are pivotally connected on their outer ends to a cross bar 32 which may be driven by a suitable face plate 33 from the shaft 34 connected to the main drive of the filter to cause the cross bar 32 to reciprocate slowly, swinging the paddles 30 back and forth around their pivots 31 to cause a slow agitation of the liquid in the sludge tank 7. The cross bar 32 is preferably pivoted to a lever 35 pivotally attached to the frame of the machine so that when the face plate 33 rotates, the pin 33ª, traveling in a slot 35ª in the lever 35 causes the desired reciprocatory motion. The location of the paddles 30 adjacent the exit of the drum from the sludge pan not only provides for the agitation of the liquid in the pan, but serves to regulate the thickness of the filter cake and to permit only a dense cake being removed on the drum.

In order to prevent cracks forming in the filter cake during the drying period and passing a major portion of the air through the cracks instead of through the filter cake, a roller 10 driven by means of a sprocket 10ª from a jack-shaft 23 is moved in a direction opposite to the direction of movement of the surface of the drum 1 and exerts a pressing and smoothing action on the filter cake which smooths out and fills the cracks formed during the drying effectively stopping any free flow of air therethrough. Rotation of the roller 10 in the reverse direction to the movement of the drum 1 provides an ironing action which smooths out the cake and also keeps the surface of the roller 10 clean by scraping off any cake which adheres to the roller. The jack-shaft 23 may be driven from the filter shaft 2 by means of suitable sprockets 24 and chain 24ª.

A modified form of cake smoothing and compacting means is shown in Fig. 14, in which a resilient blade 36 having a curved lower edge 36ª is mounted by means of a rod 37 pivoted at each end to the filter frame so as to contact with the surface of the drum 1 as it rotates to smooth the cake in a manner similar to the operation of the roller 10. To provide a suitable pressure of the blade 36 on the surface of the drum counterweights 38 are adjustably mounted on the supports 39 connected to the rod 37 to permit the pressure of the blade 36 to be regulated and permit movement of the blade to conform to any irregularities in the filter surface.

The filtrate valve, the operation of which has been previously described, is preferably of the disc type, but may be of the plug type as is well understood, it comprising a rotating member 14ª with which the filtrate pipes 17 communicate, and a stationary part 14ᵇ containing the valve chambers 20ª, 20ᵇ and 20ᶜ above referred to. The stationary part of the valve chamber is seated upon the movable part by means of a compression spring 14ᶜ and is held against rotation by the filtrate pipes 21ª, 21ᵇ and 21ᶜ, and also by means of the lug 29 suitably connected for adjustment to some stationary part of the filter by means of a control arm 29ª to permit angular adjustment of the stationary member 14ᵇ relative to the movable member 14ª controlling the cycle of filter operation. Figure 10 illustrates a modified form of the filtrate valve in which adjustable bridge walls 22ᵇ are provided between the cloudy and clear filtrate chambers and between the clear filtrate chamber and drying chamber which, by loosening the screws 22ᶜ may be shifted to other positions to permit the duration of the cloudy filtrate or the clear filtrate or the drying period to be changed relative to the duration of the other periods in the cycle. For convenience of access the housing 8 over the spray pipes 9 is provided with hinged aprons 8ª having suitable handles 8ᵇ by which the aprons may be raised when desired.

In the operation of a filter of this type, I have found it desirable to make one complete rotation about every 7¼ minutes, dividing this into a filtering period of approximately 40 seconds, 10 to 15 seconds of which produces a cloudy filtrate during the preliminary formation of a filtering cake on the filter medium, and the remaining 25 to 30 seconds forming a clear filtrate, a washing period of approximately 180 seconds, a drying period of approximately 120 seconds and a cake discharging period of approximately 95 seconds, during which time the filter sector opposite the bridge wall 22ª is not in communication with any of the vacuum chambers and in which the dry cake is removed by means of the scrapers 11.

It is to be understood that while this filter has been produced particularly for the continuous filtration of cachaza muds from sugar cane, that many of the features of the same are of advantage in other filtration problems and that the claims hereto appended are intended to cover the filter in any application to which it may be put and also to cover reasonable modifications in the construction of the same.

What I claim is:

1. In a continuous filter, a rotating filter drum, means to form a filter cake on the surface thereof, and means to reduce cracking of the filter cake during drying thereof comprising a roller contacting with said cake and means to rotate said roller in the same direction as the rotation of the filter drum.

2. In a continuous filter, a rotating filter drum, means to form a filter cake on the surface thereof, and means to prevent cracking of the filter cake during drying thereof comprising a roller contacting with said cake and means to rotate said roller in the same direction as the rotation of the filter cake comprising a jackshaft supported on the filter frame, and means to drive the jack-shaft from the filter shaft.

3. In a continuous drum filter of the type described, a filter segment comprising a metal pan and a filtering medium thereover, drainage troughs along each side of said pan, and a plurality of spacing ribs extending between said troughs to space the filtering medium from said segment and form a drainage space therebetween.

4. In a continuous drum filter of the type described, a plurality of filter segments, each comprising a metal pan and a filtering medium thereover, drainage troughs along each side of said pan, and a plurality of spacing ribs extending between said troughs to space the filtering medium from said segment and form a drainage space therebetween, a depending rib along each side of said pans, the edge of the filtering medium extending over said ribs, and means to secure the filtering medium on said pans comprising rivets passing through the said ribs and through the filter medium.

5. In a continuous rotary filter, a filtrate valve, including a stationary and a rotating portion, said stationary portion comprising a cloudy filtrate sector, a clear filtrate and wash water sector, a drying sector and a cake discharging sector, said first three sectors including chambers for receiving and discharging the various fractions passing through the filter, passages between the filter surface and the rotating portion whereby rotation of the filter causes communication successively between the various parts of the filter surface and the sectors of the filtrate valve.

6. In a continuous rotary filter, a filtrate valve, including a stationary and a rotating portion, said stationary portion comprising a cloudy filtrate sector, a clear filtrate and wash water sector, a drying sector and a cake discharging sector, said first three sectors including chambers for receiving and discharging the various fractions passing through the filter, passages between the filter surface and the rotating portion whereby rotation of the filter causes communication successively between the various parts of the filter surface and the sectors of the filtrate valve, and an adjustable bridge wall between the cloudy and clear filtrate sector and between the wash water and drying sector whereby the relative length of the sectors may be varied.

7. In a continuous filter, a rotating filter drum, having a perforated filtering medium thereon, a filtrate discharge valve having a cloudy and clear filtrate chamber, and passages whereby sections of said drum communicate successively with said cloudy and clear filtrate chambers, said communicating passages between the drum surface and the filtrate valve being of minimum capacity with reference to the volume of filtrate produced, whereby the cloudy filtrate may be quickly displaced by a small percentage of clear filtrate when the clear filtrate is produced.

8. In a continuous filter, a rotating filter drum, having a perforated filtering medium thereon, a filtrate discharge valve having a cloudy and clear filtrate chamber, and passages whereby sections of said drum communicate successively with said cloudy and clear filtrate chambers, the internal volume of the communicating passages between the filter surface and the filtrate valve being not greater than approximately one tenth the amount of clear filtrate produced to reduce the amount of cloudy filtrate trapped in the pipes when the filtrate begins to run clear.

9. In a rotary drum filter, a plurality of removable and interchangeable filter segments, each comprising a curved metal pan having one or more troughs along the side, a filtering medium thereover, said medium being individual to each element, means to space the filtering medium from the bottom of said pan and means for withdrawing the filtrate from said pan.

10. A filter segment for a rotary drum filter, comprising a segmental pan having one or more troughs along the side and adapted to fit upon a portion of the drum surface, a filtering medium over the outer surface of said pan, and means to withdraw the filtrate from said pan, said filtering medium being a hard smooth highly perforated plate.

11. In a continuous rotary filter a filtrate discharge valve, including a stationary and a rotating portion, said stationary portion comprising a cloudy filtrate chamber, a clear filtrate and wash water chamber, a drying chamber and a cake discharging portion the first three chambers including passages for receiving and discharging the various fractions passing through the filter, passages between the filter surface and the rotating portion whereby rotation of the filter causes communication successively between the various parts of the filter surface and the chambers of the filtrate valve.

12. In a continuous filter for the filtration of cachaza muds, a rotating filter drum, a shallow sludge tank adapted to submerge not more than ¼ the surface of the drum, means to draw the filtrate through the submerged portion of the drum to deposit a filter cake thereon, means to wash the deposited filter cake on the drum, means to dry the filter cake, means to smooth out the cake, means to prevent cracks therein, and means to remove the cake from said drum, said crack preventing means including a positively driven cake contacting roller and means to rotate the roller in the same direction as the drum.

13. In a continuous filter, a rotating filter drum, a plurality of shallow filter segments around the surface of said drum, a smooth hard perforated filtering medium on said segments, means to draw filtrate through said filtering medium to form a filtering cake thereon, means to separate the filtrate, means to draw air through said cake to dry said cake, means to remove the filter cake from said drum during each rotation thereof, said means including a smoothing roller and means to rotate said roller in the direction of the drum to prevent the formation of cracks in the cake during drying.

14. In a continuous filter, a rotating filter surface, means to form a filter cake thereon, and means to smooth out said cake and prevent cracks therein during the drying period comprising a smoothing roller contacting with the cake on said filter surface and means to rotate said roller in the same direction as the filter surface.

In testimony whereof I have affixed my signature to this specification.

ROBERT C. CAMPBELL.